United States Patent Office 2,721,201
Patented Oct. 18, 1955

2,721,201

5-MONOFLUOROALKYL BARBITURIC ACIDS

Richard de V. Huber, Wilmington, Del., and William F. Bruce, Havertown, Pa., assignors, by mesne assignments, to American Home Products Corporation, New York, N. Y., a corporation of Delaware No Drawing. Application July 15, 1952,
Serial No. 299,013

8 Claims. (Cl. 260—257)

This invention relates to novel fluorine-containing barbituric acids and to fluoro-substituted malonic esters which may be used in the preparation of the fluorine-containing barbituric acids.

Our invention is also concerned with the method by which these novel compounds, both the fluorine-containing barbituric acids and the fluoro-substituted malonic esters, may be prepared from readily available starting materials.

While halogenoalkylbarbituric acids in which the halogen atom is chlorine, bromine or iodine have been previously described in the chemical literature, they are not useful for any practical purpose. In this connection attention is directed to the article of Skinner J. A. C. S. 59, 322–324, (1937); and the article of Skinner, et al., J. A. C. S. 72, 1140–1, (1950).

Fluorine-containing barbituric acids have never been previously prepared, nor have any compounds of this type ever been described in the chemical literature. In view of the general lack of utility of the chlorine, bromine and iodine-containing barbituric acids, and the volatile and generally toxic character of fluorine, it was generally considered that fluorine-containing barbituric acids would be of no practical value, and would, in fact, be generally so toxic as to render them useless for hypnotic, sedative, or soporific use.

In spite of this expected lack of therapeutic or other utility for fluorine-containing barbituric acids, we have prepared such compounds, and have found, surprisingly enough, that contrary to the general expectancy, the fluoro-substituted barbituric acids are valuable soporific agents, being especially useful for veterinary use on animals. They exhibit very effective sedative action, and produce sound slumber with rapid onset thereof. Moreover, these compounds, which are highly potent as hypnotics, are no more toxic than many of the barbituric acid derivatives presently in medical use.

It is accordingly a primary object of our invention to render available fluorine-containing barbituric acids, which compounds exhibit desirable pharmacological properties without undue toxicity, and are of considerable value for medical and other purposes. Another object of our invention is to prepare certain novel esters of malonic acid which contain a fluoro-substituted alkyl grouping as a substituent, which malonic esters may be utilized in the preparation of our novel fluorine-containing barbituric acids.

Our novel fluorine-containing barbituric acids may be readily prepared by reacting a substituted malonic ester and urea, and details of the preferred procedure to be followed in carrying out this reaction will be subsequently given. There can be thus prepared fluoro-substituted barbituric acids of a type which may be represented generically by the following formula:

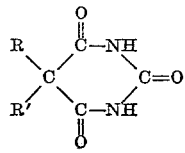

where R represents an alkyl group, including both straight chain alkyl groups; branched chain alkyl groups; and alkyl groups containing unsaturated hydrocarbon substituents; and R' represents a monofluoro-substituted alkyl group wherein said fluorine atom is attached to a carbon atom of said alkyl group subsequent to the second carbon atom thereof.

Among typical fluorine-containing barbituric acids as defined by the above generic formula which fall within the scope of our invention, we may specifically mention: 5-ethyl-5-(3'-fluoropropyl)barbituric acid; 5-allyl-5-(3'-fluoropropyl)barbituric acid; 5-isoamyl-5-(3'-fluoropropyl)barbituric acid; 5-allyl-5-(5'-fluoro-n-amyl)barbituric acid; 5-ethyl-5-(5'-fluoro-n-amyl)barbituric acid; etc.

Other typical compounds falling within the scope of our invention may be characterized by reference to the generic formula, as follows:

When R is methyl, R' may be 3-fluoropropyl, 4-fluorobutyl, 5-fluoroamyl, 6-fluorohexyl, 7-fluoroheptyl, etc.

When R is ethyl, R' may be 3-fluoropropyl, 4-fluorobutyl, 5-fluoroamyl, 6-fluorohexyl, etc.

When R is propyl, isopropyl, n-butyl, isobutyl, sec. butyl, tert. butyl, n-amyl, isoamyl or allyl, for example, R' may be 3-fluoropropyl, 4-fluorobutyl or 5-fluoroamyl; similarly, when R is sec. amyl or tert. amyl, R' may be 3-fluoropropyl, etc.

Among preferred fluorine-containing barbituric acids coming within the scope of our invention, it may be remarked that those mentioned are characterized by a fluoroalkyl group in the 5-position which contains from three to seven carbon atoms, the fluorine atom being attached to the terminal carbon atom, (i. e. the fluoroalkyl group is an ω-fluoro-substituted alkyl group). These constitute one of our preferred classes of fluorobarbituric acids.

However, it is not necessary that the fluorine atom be on the terminal carbon, as the substituent in the 5-position of the barbituric acid may contain fluorine attached to an intermediate carbon atom or to atoms which are bonded to adjacent carbon atoms in the radical. Generaly the fluorine should be on the third to fifth carbon atom of the chain. Among examples of 3-fluororadicals which may be attached in the 5-position of the barbituric acid we may mention:

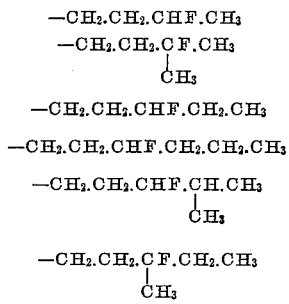

and

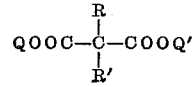

The procedure for introducing fluorine in hydrocarbon chains is of course well known, and the above, as well as other fluorine-containing substituents, are all suitable substituents in our fluorine-containing barbituric acids.

The other aliphatic radical in the 5-position in our new compounds will ordinarily be a lower alkyl group, either straight chain or branched chain, which contains up to five carbon atoms, or an unsaturated aliphatic hydrocarbon radical.

The novel malonic esters which are useful in preparing our new fluorine-containing barbituric acids may be represented generically by the following formula:

$$QOOC-\underset{R'}{\underset{|}{C}}-COOQ'$$

where R and R' have the significance indicated above, i. e. R represents an alkyl group, including both straight chain alkyl groups; branched chain alkyl groups; and alkyl groups containing unsaturated hydrocarbon substituents; and R' represents a monofluoro-substituted alkyl group wherein said fluorine atom is attached to a carbon atom of said alkyl group subsequent to the second carbon atom thereof, generally one having from three to seven carbon atoms and a terminal fluorine atom. Q and Q' represent ester-forming alkyl groups, which will generally be lower alkyl groups.

Among fluoroalkyl-substituted malonic esters which are useful in preparing the fluorine-containing barbituric acids, certain specific examples of which are referred to above as typical, we may mention the diethyl ester of ethyl(3-fluoropropyl)malonic acid; the diethyl ester of allyl(3-fluoropropyl)malonic acid; the diethyl ester of isoamyl(3-fluoropropyl)malonic acid; the diethyl ester of allyl(5-fluoro-n-amyl)malonic acid; the diethyl ester of ethyl(5-fluoro-n-amyl)malonic acid, etc.

In preparing the novel esters of malonic acid which are suitable for use in the preparation of fluorine-containing barbituric acids, we preferably react an ω-halo-ω'-monofluoroalkane and an alkali metal derivative of the monoalkylmalonic ester. The reaction is readily carried out, preferably in an anhydrous alcohol and in the presence of a condensing agent such as an alkali metal, an alkali metal hydride, or an alkali metal ethoxide, etc., and results in the introduction of the ω-monofluoro-substituted alkyl group in the malonic ester. Yields between about 40 and 50% are readily obtainable.

In this way the following monofluoroalkyl malonic esters are readily prepared in high yields, these novel compounds being characterized by the physical properties given below:

| Ester | Boiling Point | Density | Refractive Index |
|---|---|---|---|
| Diethyl ethyl(3-fluoropropyl)malonate | 96–103° C. (2.0 millimeters' pressure). | $1.043 \left(\frac{25}{25}\right)$ | $1.4245 \left(\frac{25}{D}\right)$ |
| Diethyl allyl(3-fluoropropyl)malonate | 121–126° C. (7.0 millimeters' pressure). | $1.0414 \left(\frac{24}{24}\right)$ | $1.4350 \left(\frac{24}{D}\right)$ |
| Diethyl isoamyl(3-fluoropropyl)malonate | 120–123° C. (6.0 millimeters' pressure). | $1.005 \left(\frac{25}{25}\right)$ | $1.4275 \left(\frac{25}{D}\right)$ |
| Diethyl allyl(5-fluoro-n-amyl)malonate | 150–155° C. (5.0 millimeters' pressure). | $1.012 \left(\frac{25}{25}\right)$ | $1.4376 \left(\frac{25}{D}\right)$ |
| Diethyl ethyl(5-fluoro-n-amyl)malonate | 135–138° C. (4.0 millimeters' pressure). | $1.011 \left(\frac{26}{26}\right)$ | $1.4294 \left(\frac{26}{D}\right)$ |

In preparing the novel fluorine-containing barbituric acids, the particular ester of malonic acid containing a fluoro-alkyl substituent, particularly an alkyl group containing an ω-monofluoro substituent, is reacted with urea in the customary way to form the novel barbituric acid compounds. The reaction is preferably carried out by bringing urea and the malonic ester into contact in an anhydrous alcohol, preferably in the presence of a condensing agent such as an alkali metal, alkali metal hydride, or an alkali metal alkoxide.

Typical fluoroalkyl barbituric acids thus produced are characterized by the melting points tabulated below:

| Compounds | Melting Points, °C. |
|---|---|
| 5-ethyl-5-(3'-fluoropropyl)barbituric acid | 154–155 |
| 5-allyl-5-(3'-fluoropropyl)barbituric acid | 145–146 |
| 5-isoamyl-5-(3'-fluoropropyl)barbituric acid | 139–141 |
| 5-allyl-5-(5'-fluoro-n-amyl)barbituric acid | 105–106.5 |
| 5-ethyl-5-(5'-fluoro-n-amyl)barbituric acid | 120–122 |

The following is illustrative of our invention:

EXAMPLE 1

A.—Preparation of 1-bromo-3-fluoropropane

Trimethylene bromide in the amount of 202 grams, 87.5 grams of dry potassium fluoride and 125 grams (113 milliliters) of dry ethylene glycol were stirred together and heated at a temperature of 88°–100° C. for a period of seven hours in a 3-neck Pyrex flask of 500 milliliters capacity, the flask being equipped with a mercury-seal stirrer, a thermometer, and a reflux condenser containing a tube filled with calcium chloride. The reaction mixture was then cooled and washed with 250 milliliters of water. The heavy organic layer which separated was dried over calcium chloride, and rectified by distillation. The product was colorless 1-bromo-3-fluoropropane, boiling at 100–105° C. and having a refractive index of $$1.4318 \left(\frac{24}{D}\right)$$

B.—Preparation of the diethyl ester of isoamyl(3-fluoropropyl)malonic acid

Clean dry sodium metal in the amount of 2.07 grams was dissolved in 50 milliliters of absolute ethanol using a 3-neck flask of 100 milliliters capacity, which flask was equipped with a mercury-seal stirrer, a dropping funnel with a calcium chloride tube, and a reflux condenser also with a calcium chloride tube. The resulting solution of sodium ethoxide was heated to a temperature of 45–50° C. in a water bath, and 19.5 grams of diethyl isoamyl-malonate was then added. The malonic ester was added dropwise during 40 minutes, the solution being agitated during this period. While the solution was still maintained at 45° C. there was added, all at once, 12.0 grams of 1-bromo-3-fluoropropane.

Stirring was then stopped, and the temperature of the water bath was slowly raised to 65° C. during a period of one hour, and maintained at this temperature for five and one-half hours. The reaction mixture was then allowed to stand overnight at room temperature.

The ethanol was then distilled off from the reaction mixture by distillation at atmospheric pressure, utilizing an oil bath which was heated to a temperature not in excess of 110° C. Sufficient hydrochloric acid of 20% concentration was then added to make the remaining liquid acid to litmus, and this liquid was then shaken with water to dissolve inorganic salts. The light organic layer was separated, washed once with water, and then dried over calcium chloride.

Distillation of this organic layer yielded 4.0 grams of unchanged malonic ester, having a boiling point of 100–109° C. (at 4 millimeters pressure) and a refractive index of $$1.424 \left(\frac{22}{D}\right)$$

There was thus obtained 10.7 grams of crude diethyl isoamyl(3-fluoropropyl)malonate having a boiling point of 112–124° C. (at 4 millimeters pressure), and a refractive index of $$1.428 \left(\frac{22}{D}\right)$$

By redistillation of this crude product there was obtained 6.5 grams of substantially pure diethyl isoamyl(3-fluoropropyl)malonate boiling at 120–123° C. (at 6 millimeters of mercury pressure).

By a similar procedure various other fluoroalkyl malonic esters, more particularly diethyl ethyl(3-fluoropropyl)malonate; diethyl allyl(3-fluoropropyl)malonate;

and diethyl ally(5-fluoro-n-amyl)malonate were prepared.

C.—Preparation of 5-isoamyl-5-(3'-fluoropropyl) barbituric acid

Clean dry sodium metal in the amount of 1.43 grams was dissolved in 28 milliliters of absolute ethanol using a 3-neck flask of 100 milliliters capacity, this flask being equipped with a mercury-seal stirrer and a reflux condenser having a calcium chloride tube. There was added to the resulting solution of sodium ethoxide, at room temperature and with stirrring, 2.48 grams of fused powdered urea and 6.0 grams of diethyl isoamyl(3-fluoropropyl)malonate, these reactants being added in the specified order and all at once. When all of the urea had gone into solution agitation was stopped, and the reaction mixture was heated at a temperature within the range 65–70° C. for a period of sixteen hours. It was then allowed to stand for three days at room temperature, whereupon the reaction mixture was heated at a temperature of 45° C. at a pressure of 15 millimeters of mercury in order to distill off the ethanol.

The residue was then dissolved in 40 milliliters of cold water, extracted with chloroform, and acidified by the addition of hydrochloric acid of 20% concentration until the solution was just acid to Congo red paper while ice cold. The precipitate which appeared in the liquid was filtered off with suction, and washed with cold water and petroleum ether (B. P. 30–75° C.). It was then dried at 50° C., and the dried product amounted to 3.0 grams of solid product having a melting point of 120–130° C.

This crude product was then recrystallized four times, each time by dissolving it in the minimum amount of cold absolute ethanol necessary to dissolve the solid product, warming the resulting solution in a steam bath, and reprecipitating the product by adding twice the volume of water and cooling. The pure product thus obtained had a melting point of 139–141° C. and was substantially pure 5-isoamyl-5-(3'-fluoropropyl)barbituric acid. It gave a positive Koppanyi test (J. Am. Pharm. Assoc., 23, p. 1079 (1934), for 5,5-dialkyl barbituric acids.

EXAMPLE 2

A.—Preparation of 1-chloro-5-fluoropentane

Dry potassium fluoride in the amount of 174 grams, 240 milliliters of dry ethylene glycol and 282 grams of pentamethylene dichloride were stirred together, and the mixture then heated at 130–135° C. for seven hours. This was accomplished by using a 3-neck flask of 1000 milliliters capacity which was equipped with a mercury-seal stirrer, a dropping funnel protected by a calcium chloride tube and a reflux condenser also equipped with a calcium chloride tube.

After cooling, the reaction mixture was shaken with 520 milliliters of water. The light organic layer which separated was dried over calcium chloride and rectified by distillation. There was thus obtained 25.0 grams of colorless 1-chloro-5-fluoropentane, boiling at 105–110° C. (at 100 milliliters mercury pressure). Its refractive index was $$1.4115 \left(\frac{25}{D}\right)$$

B.—Preparation of diethyl ester of ethyl(5-fluoro-n-amyl)malonate

Clean dry sodium metal in the amount of 2.42 grams was dissolved in 55 milliliters of absolute ethanol using a 3-neck flask of 100 milliliters capacity equipped with a mercury-seal stirrer, a dropping funnel protected by a calcium chloride tube, and a reflux condenser also equipped with a calcium chloride tube. The bath temperature surrounding the flask was maintained at 45–50° C., and 18.8 grams of diethyl ethyl-malonate was added to the contents of flask, drop by drop, with stirring, over a period of twenty minutes. While the bath temperature was maintained at 45–50° C., there was also added 12.5 grams of 1-chloro-5-fluoropentane, with stirring, over a period of twenty minutes.

Agitation of the contents of the reaction mixture was then stopped, and the mixture was heated at 55–70° C. for the first four hours, and then at 75–78° C. for an additional period of three hours. It was then allowed to stand overnight at room temperature.

The ethanol was then distilled off at atmospheric pressure, the reaction mixture being heated by means of an oil bath whose temperature did not exceed 130° C. The residue was made acid to litmus by the addition of 20% hydrochloric acid, and then shaken with water to dissolve the inorganic salts. It was then separated into two layers, and the heavier water layer was extracted once with ether. This ether extract was then added to the light organic layer, and the light organic layer then dried over calcium chloride.

Distillation of the light organic layer yielded 7.1 grams of unchanged malonic ester, boiling at 84–95° C. (3.0 millimeters pressure), and having a refractive index of $$1.4157 \left(\frac{25}{D}\right)$$

There was obtained 8.0 grams of pure diethyl ethyl(5-fluoro-n-amyl)malonate, boiling at 135–138° C. (4.0 millimeters of mercury pressure). The product had a refractive index of $$1.4294 \left(\frac{26}{D}\right)$$

and a density of $$1.011 \left(\frac{26}{26}\right)$$

C.—Preparation of 5-ethyl-5-(5'-fluoro-n-amyl)barbituric acid

Clean dry sodium metal in the amount of 1.86 grams was dissolved in 43 milliliters of absolute ethanol using a 3-neck flask of 100 milliliters capacity which flask was equipped with a mercury seal stirrer, a dropping funnel protected by a calcium chloride tube, and a reflux condenser also protected by a calcium chloride tube. To the solution there was added at room temperature, with stirring, 3.24 grams of dry urea and 7.5 grams of diethyl ethyl(5-fluoro-n-amyl)malonate, the reactants being added in this order and all at once. When all of the urea had gone into solution, stirring was stopped, and the reaction mixture was heated at a temperature of 70–75° C. for a period of nine hours.

The ethanol was then distilled off at a reduced pressure equivalent to 100 millimeters of mercury, the pot temperature not exceeding 60° C. The yellow, viscous residue was dissolved in a minimum amount of ice-cold water, extracted once with chloroform, filtered, and acidified with 1:1 hydrochloric acid until it was acid to Congo red paper. The precipitate was filtered off with suction, washed with 20 milliliters of cold water and 50 milliliters of petroleum ether, and air dried. The crude product amounted to 5.0 grams and melted at 80–110° C.

Recrystallization of the product three times from dilute ethanol, and then once from absolute ethanol, yielded 2.5 grams of pure 5-ethyl-5-(5'-fluoro-n-amyl)barbituric acid, this product melting at 120–122° C.

By following procedures similar to those described in the illustrative examples, the other fluoroalkyl barbituric acids referred to above are readily prepared.

In carrying out the reaction between urea and the fluoroalkyl malonic ester in the presence of a condensing agent such as an alkali metal ethoxide, best results are generally secured by having the alkali metal, urea and alkyl(fluoroalkyl)malonate ester present substantially in the molar ratio of 3:2:1. In the foregoing example, which is illustrative of our invention, the sodium, urea and diethyl isoamyl(3-fluoropropyl)malonate were present substantially in this molar ratio of 3:2:1.

The salts of the novel fluorine-containing barbituric acids, particularly the alkali metal salts thereof, are pharmacologically recognized to be equivalent to the acids themselves. They can be readily prepared by reacting the acids with a base, such as sodium hydroxide or potassium hydroxide. In those appended claims wherein no specific reference is made to salts, they are intended to be comprehended within the term acid or acids, since they are fully equivalent thereto.

The above description and illustrative examples are intended to be typical only. Modifications thereof, as well as variations therefrom, which conform to the spirit of the invention are intended to be included within the scope of the appended claims.

We claim:

1. A compound of the formula:

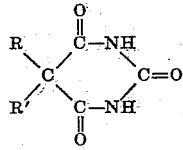

where R is a radical selected from the group which consists of lower alkyl and allyl, and R' represents a monofluoro-substituted alkyl group having from 3 to 7 carbon atoms wherein said fluorine atom is attached to a carbon atom of said alkyl group subsequent to the second carbon atom thereof.

2. 5-ethyl-5-(3'-fluoropropyl)barbituric acid.
3. 5-allyl-5-(3'-fluoropropyl)barbituric acid.
4. 5-isoamyl-5-(3'-fluoropropyl)barbituric acid.
5. 5-allyl-5-(5'-fluoro-n-amyl)barbituric acid.
6. 5-ethyl-5-(5'-fluoro-n-amyl)barbituric acid.
7. The process of preparing fluorine-containing barbituric acid derivatives which comprises reacting an ester of malonic acid containing a monofluoroalkyl substituent and urea in an anhydrous alcohol and in the presence of an alkaline condensing agent.
8. The process of preparing fluorine-containing barbituric acid derivatives which comprises reacting an ester of malonic acid containing an ω-monofluoro-substituted alkyl group with urea by bringing said reactants into contact in an anhydrous alcohol in the presence of an alkali metal alkoxide condensing agent.

References Cited in the file of this patent

UNITED STATES PATENTS

| | | |
|---|---|---|
| 2,006,610 | Tabern | July 2, 1935 |
| 2,019,936 | Shonle | Nov. 5, 1935 |
| 2,035,317 | Heilner | Mar. 24, 1936 |
| 2,222,455 | Cope | Nov. 19, 1940 |
| 2,313,501 | Bachman et al. | Mar. 9, 1943 |

FOREIGN PATENTS

| | | |
|---|---|---|
| 883,540 | France | July 7, 1943 |

OTHER REFERENCES

Skinner et al.: J. Am. Chem. Soc. 59, 322–324 (1937).
Sayles: J. Am. Chem. Soc., 71, 3161–3162 (1949).